(12) United States Patent
Raassina

(10) Patent No.: US 9,731,904 B2
(45) Date of Patent: Aug. 15, 2017

(54) ELECTRONIC SAFETY DEVICE AND A CONVEYOR SYSTEM

(71) Applicant: Pasi Raassina, Numminen (FI)

(72) Inventor: Pasi Raassina, Numminen (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 14/960,772

(22) Filed: Dec. 7, 2015

(65) Prior Publication Data

US 2016/0214800 A1  Jul. 28, 2016

(30) Foreign Application Priority Data

Jan. 28, 2015  (FI) .................................... 20155060

(51) Int. Cl.
| | | |
|---|---|---|
| B66B 29/00 | (2006.01) | |
| B65G 43/00 | (2006.01) | |
| B66B 25/00 | (2006.01) | |
| B66B 5/00 | (2006.01) | |
| G05B 9/02 | (2006.01) | |

(52) U.S. Cl.
CPC ............ B65G 43/00 (2013.01); B66B 5/0031 (2013.01); B66B 25/006 (2013.01); G05B 9/02 (2013.01)

(58) Field of Classification Search
CPC .............................. B66B 29/00; B66B 29/005
USPC ....................................................... 198/323
See application file for complete search history.

(56) References Cited

U.S. PATENT DOCUMENTS

| | | | | |
|---|---|---|---|---|
| 5,526,256 A | * | 6/1996 | Sakata ................... | B66B 29/005 198/323 |
| 5,601,178 A | * | 2/1997 | Zaharia ................... | B66B 25/00 198/323 |
| 5,611,417 A | * | 3/1997 | Stawniak ................ | B66B 29/06 198/323 |
| 6,112,166 A | * | 8/2000 | Joosten ................... | B66B 27/00 198/323 |
| 6,230,871 B1 | * | 5/2001 | Balzer-Apke ........... | B66B 25/00 198/323 |
| 6,827,196 B2 | * | 12/2004 | Wiesinger ............. | B66B 29/005 198/322 |

(Continued)

FOREIGN PATENT DOCUMENTS

| | | |
|---|---|---|
| CN | 103818794 A | 5/2014 |
| EP | 2604566 A1 | 6/2013 |

(Continued)

OTHER PUBLICATIONS

Finish Search Report for Application No. 20155060 Dated Aug. 20, 2015.

*Primary Examiner* — Douglas Hess
(74) *Attorney, Agent, or Firm* — Harness, Dickey & Pierce P.L.C.

(57) ABSTRACT

The invention relates to an electronic safety device and a conveyor system comprising the same. The electronic safety device has a safety input for receiving a safety signal, the electronic safety device being configured to terminate its operation responsive to absence of the safety signal in the safety input. The electronic safety device comprises an operation-preventing circuit configured to detect an operational anomaly in the safety input, the operation-preventing circuit comprising a switch adapted to short the safety input when the operational anomaly is present in the safety input.

19 Claims, 2 Drawing Sheets

(56) References Cited

U.S. PATENT DOCUMENTS

| | | | | |
|---|---|---|---|---|
| 6,966,419 B2* | 11/2005 | Tada | ............... | B66B 29/06 |
| | | | | 198/323 |
| 6,997,302 B2* | 2/2006 | Fargo | ............... | B66B 23/02 |
| | | | | 198/323 |
| 7,084,588 B2* | 8/2006 | Hampo | ............... | H02P 29/02 |
| | | | | 318/139 |
| 7,269,465 B2* | 9/2007 | Esch | ............... | G05B 19/042 |
| | | | | 370/216 |
| 7,407,048 B2* | 8/2008 | Boom | ............... | B66B 25/00 |
| | | | | 198/323 |
| 7,544,918 B2* | 6/2009 | Herzog | ............... | B23K 13/01 |
| | | | | 219/388 |
| 7,568,570 B2* | 8/2009 | Stripling | ............... | B66B 29/005 |
| | | | | 198/322 |
| 7,699,157 B2* | 4/2010 | Poyner | ............... | B65G 43/00 |
| | | | | 198/383 |
| 8,997,968 B2* | 4/2015 | Braasch | ............... | B66B 29/005 |
| | | | | 198/322 |
| 9,272,882 B2* | 3/2016 | Soldner | ............... | B66B 25/00 |
| 9,469,504 B2* | 10/2016 | Hopp | ............... | B66B 29/00 |

FOREIGN PATENT DOCUMENTS

| | | | |
|---|---|---|---|
| GB | 2241595 | A | 9/1991 |
| JP | 2013-014409 | A | 1/2013 |
| WO | WO-2010/121629 | A1 | 10/2010 |
| WO | WO-2013/178874 | A1 | 12/2013 |

* cited by examiner

ELECTRONIC SAFETY DEVICE AND A CONVEYOR SYSTEM

This application claims priority to Finnish Patent Application No. 20155060 filed on Jan. 28, 2015, the entire contents of which are incorporated herein by reference.

FIELD OF THE INVENTION

The subject matter described herein relates to electronic safety devices.

BACKGROUND OF THE INVENTION

In automation systems and conveyor systems, for example, there must be a safety system according to safety regulations. The safety system interrupts operation (e.g. running of automation system/conveyor system) when detecting that safety is somehow compromised.

Traditionally the safety systems have included one or more safety contacts fitted to measure position of doors, movement limits of the equipment etc. safety-related system parameters. During normal operation the safety contacts are closed. Opening of at least one safety contact indicates a potential risk.

The safety system outputs a safety signal after it has passed via a plurality of safety contacts. The passed safety signal goes further to one or more safety devices, such as circuit breakers. Opening of at least one of the safety contacts interrupts the safety signal, which causes the circuit breaker to switch off main circuit power, bringing the system to standstill.

More recently, electronic safety devices have been accepted as part of the safety systems. The electronic safety device means an electronic device performing safety-related operations, e.g. operations affecting the system safety. Such electronic safety devices may be, for example, drive components and brake control units of conveyor systems, in particular of elevator systems, escalator systems and moving walkways.

The electronic safety devices are specially designed devices to implement functional safety according to associated standards, such as safety standard EN IEC 61508.

As regards to the electronic safety devices in general, there is need for improvements.

AIM OF THE INVENTION

In view of the foregoing, the aim of the invention is to introduce an improvement to the electronic safety devices. In particular, it is intended to bring forward solution for interfacing the electronic safety device to the safety signal of the safety system in safer and more reliable manner.

To achieve this aim the invention discloses an electronic safety device and a conveyor system Some inventive embodiments, as well as inventive combinations of various embodiments are presented in the specification and in the drawings of the present application.

SUMMARY OF THE INVENTION

An aspect of the invention is an electronic safety device having a safety input for receiving a safety signal. The electronic safety device also has a safety logic configured to block operation of the electronic safety device responsive to absence of the safety signal in the safety input. The electronic safety device comprises an operation-preventing circuit configured to detect an operational anomaly in the safety input. The operation-preventing circuit comprises a switch adapted to short the safety input when an operational anomaly is present in the safety input. The safety input is shorted by connecting the safety input with the switch to the electrical reference level (e.g. signal ground) of the safety signal. This means, inter alia, that safety risk caused by an unallowed voltage in the safety input may be void by shorting the safety input. Shorting of the safety input has the same effect as interrupting the safety signal; therefore operation of the electronic safety device is interrupted and system is brought to safe state when the safety input is shorted.

Another aspect of the invention is a conveyor system comprising a safety system configured to output a safety signal. The conveyor system comprises the electronic safety device according to the disclosure. The safety input of the electronic safety device is coupled to the safety signal.

According to one or more embodiments, the operational anomaly is an unallowed voltage in the safety input.

According to one or more embodiments, the operation-preventing circuit is configured to detect an unallowed voltage in the safety input by momentarily shorting the safety input.

According to one or more embodiments, the operation-preventing circuit is configured to detect an unallowed voltage in the safety input by momentarily shorting the safety input in power up situation of the electronic safety device. In the power up situation the safety signal should normally be interrupted to prevent false operation of the electronic safety device. On the other hand, if an unallowed voltage is for some reason present in the safety input while powering up the electronic safety device, the harmful effect caused by this may be void by shorting the safety input as disclosed above. The unallowed voltage may result from bridging of one or more safety contacts with a bypass wire, for example.

According to one or more embodiments, the switch is configured to short the safety input as long as the operational anomaly is present in the safety input.

According to one or more embodiments, the switch is configured to short the safety input responsive to an overvoltage in the safety input.

According to one or more embodiments, the operation-preventing circuit comprises a power supply having its output coupled to the control pole of the switch. According to one or more embodiments, the power supply is configured to supply current momentarily to the control pole of the switch in power up situation of the electronic safety device.

According to one or more embodiments, the switch is a thyristor.

According to one or more embodiments, the electronic safety device is configured to permit its operation responsive to presence of the safety signal in the safety input.

According to one or more embodiments, the electronic safety device is a control device of an electromagnetic brake.

According to one or more embodiments, the electronic safety device is a conveyor drive unit.

The invention makes it possible to design an electronic safety device without need to use any specific safety-related computer software for monitoring and protection of the safety input. Therefore the workload required for safety-related software design and approval process may be omitted or at least reduced.

In some embodiments, the conveyor system is an elevator system. In some alternative embodiments, the conveyor system is an escalator system. In still some other alternative embodiments, the conveyor system is a moving walkway.

The preceding summary, as well as the additional features and additional advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Figure 1:
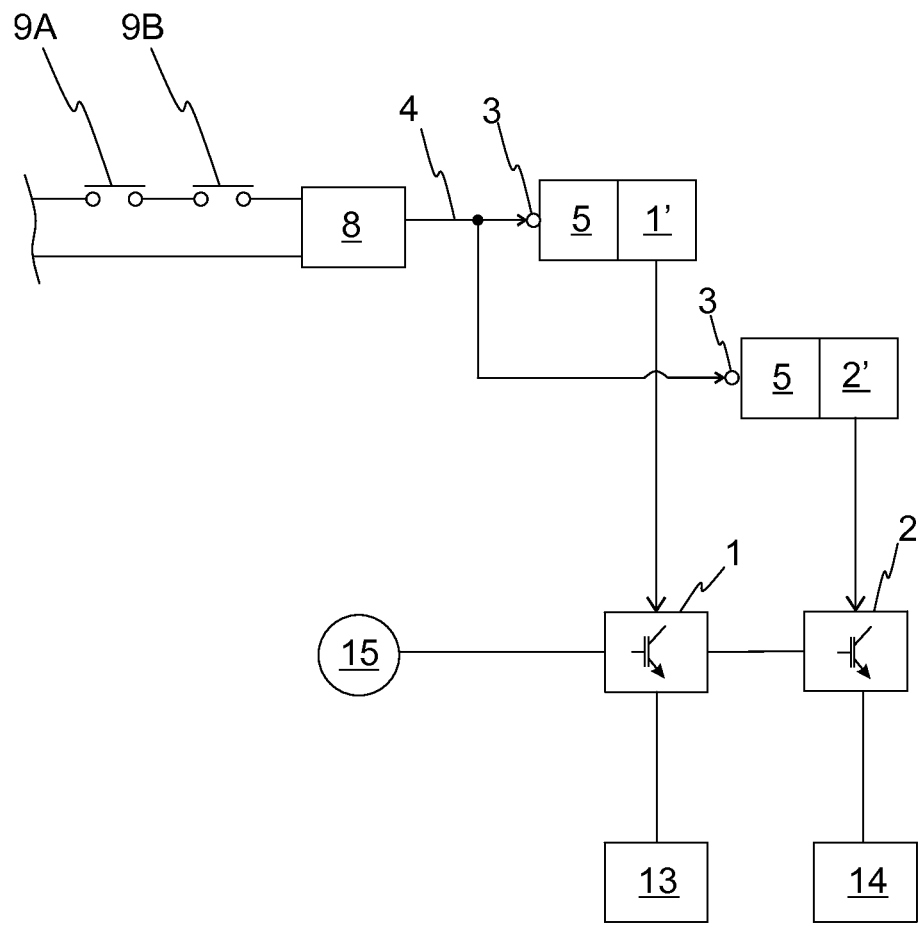
FIG. 1 shows a block diagram of an elevator system according to an exemplary embodiment.
Figure 2:
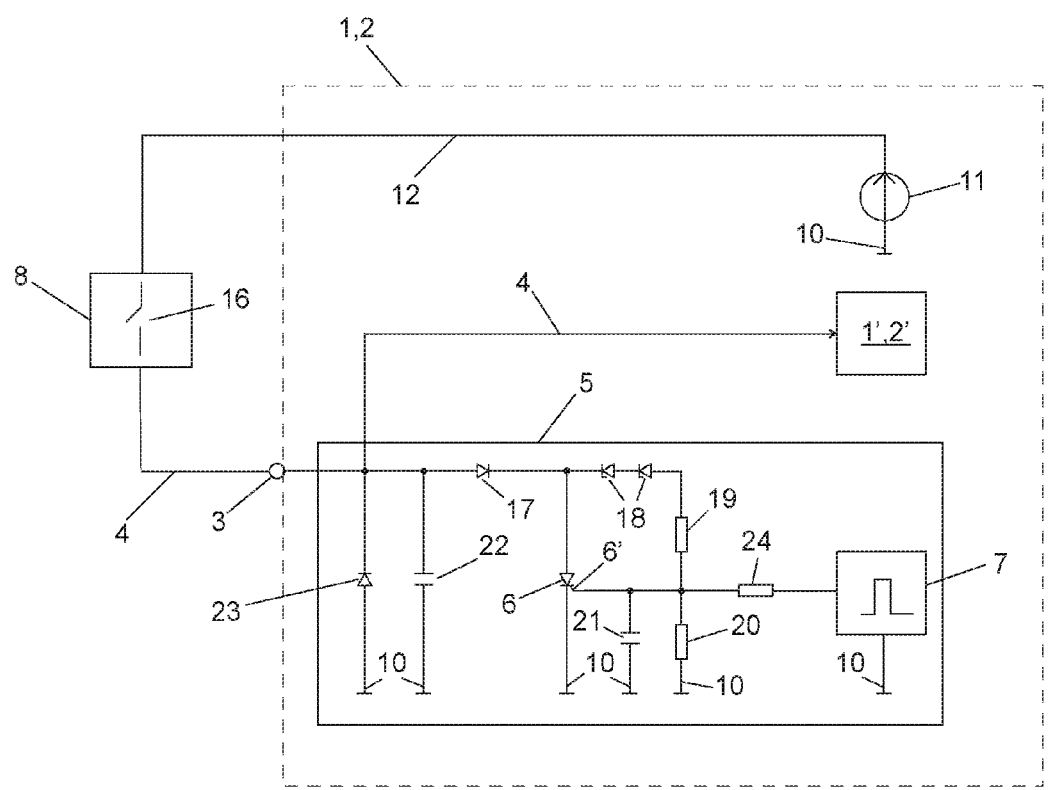
FIG. 2 shows a circuit diagram of the operation-preventing circuit according to an exemplary embodiment.

For the sake of intelligibility, in FIGS. 1 and 2 only those features are shown which are deemed necessary for understanding the invention. Therefore, for instance, certain components/functions which are widely known to be present in corresponding art may not be shown.

In the description same references are always used for same items.

FIG. 1 shows a block diagram of an elevator system according to an exemplary embodiment. The elevator system of FIG. 1 comprises an elevator drive, which is operable to drive an elevator car in an elevator hoistway with the hoisting motor 14, according to service requests from the elevator passengers.

The hoisting motor 14 is preferably an electric motor, such as a permanent magnet motor, an induction motor, a reluctance motor or corresponding. The hoisting motor 14 may be a linear motor or a rotating one, depending on the elevator configuration. The moving/rotating part of the hoisting motor 14 is mechanically coupled to the elevator car such that driving the motor moves the elevator car. Motor 14 is driven by supplying current to the motor with an electronic power supply apparatus 2. The elevator drive of FIG. 1 has a rotating permanent magnet synchronous motor 14. A frequency converter 2 is used for supplying power from the mains 15 to the permanent magnet synchronous motor 14.

Two electromagnetic brakes 13 are adapted to brake movement of the hoisting motor 14 and thereby movement of elevator car. The brakes 13 are applied when elevator is idle, and they are opened for the duration of elevator run.

Both electromagnetic brakes 13 comprise a frame part fixed to the frame of the hoisting motor 14 and an armature part movably supported on the frame part. An electromagnet is fitted inside the frame part. When current is supplied to the electromagnet, the armature part disengages the braking surface of the hoisting motor 14 to open the brake. When current supply to the electromagnet is interrupted, the armature part engages the braking surface to apply the brake. Current supply of the electromagnets is controlled with an electronic brake control unit 1. Brake control unit 1 is coupled to the mains 15.

The elevator system of FIG. 1 comprises a safety system, which comprises plurality of safety contacts 9A, 9B connected to an electronic safety controller 8. The safety contacts 9A, 9B are fitted, for example, to supervise the position/locking of entrances to the elevator hoistway as well as the operation of the overspeed governor of the elevator car. One or more of the safety contacts 9A, 9B may be connected in series. During normal elevator operation the safety contacts 9A, 9B are closed. Opening of a safety contact 9A, 9B indicates an operational anomaly of the elevator system, such as the opening of an entrance to the elevator hoistway, the arrival of the elevator car at an extreme limit switch for permitted movement, activation of the overspeed governor, et cetera.

The electronic safety controller 8 is a specific microprocessor-controlled safety device fulfilling the EN IEC 61508 safety regulations as well as corresponding EN-81 elevator standard. Also the brake control unit 1 as well as the frequency converter 2 are electronic safety devices according to the standards. The safety controller 8, the brake control unit 1 and the frequency converter 2 are designed to comply with SIL 3 safety integrity level.

The electronic safety controller 8 monitors the safety of the elevator system on the basis of readings from the safety contacts 9A, 9B. The electronic safety controller 8 outputs a safety signal 4 during normal elevator operation. Both brake control unit 1 and frequency converter 2 have safety inputs 3 connected to the safety signal 4. In case at least one of the safety contacts 9A, 9B opens, the electronic safety controller 8 determines an operational anomaly and interrupts the safety signal 4. Interrupting the safety signal 4 has the effect that the frequency converter 2 disconnects power supply of the hoisting motor 14 and the brake control unit 1 activates the electromagnetic brakes 13, to break movement of the hoisting motor 14, thereby bringing the elevator system to a safe state.

The frequency converter 2 and the brake control unit 1 are both provided with a safety logic, which is configured to block operation of the frequency converter 2/brake control unit 1 responsive to absence of the safety signal 4 in the safety input 3. The frequency converter 2 is provided with a safe torque off logic 2', which is a SIL 3-level safety logic taking care of the disconnection of the power supply of the hoisting motor 14 in case the safety signal 4 is interrupted. Correspondingly, the brake control unit 1 is provided with a brake applying logic 1', which takes care of interrupting of the current to the electromagnets to apply the electromagnetic brakes 13 in case the safety signal 4 is interrupted. The operation of the safe torque off logic 2' (with name "drive prevention logic", item no. 15) as well as the brake applying logic 1' (with name "brake drop-out logic", item no. 16) is disclosed in international patent application no. WO2013/178874 A1, which is incorporated herein by reference.

FIG. 2 shows as an exemplary embodiment how the safety signal 4 is generated. DC voltage supply 11 supplies +24V DC voltage from frequency converter 2 to the electronic safety controller 8. In the electronic safety controller 8 there are two safety relays 16 having contacts connected in series with each other, and the +24V DC voltage is connected to one end of the serial-connection of the contacts. The other end of the serial connection of the contacts forms an output to the safety signal 4, and the safety signal 4 is connected from the electronic safety controller 8 further to the safety input 3 of brake control unit 1 and frequency converter 2. The computer inside the electronic safety controller 8 runs a safety program that controls the safety relays 16 such that safety relay contacts are closed during normal elevator operation, allowing the +24V DC voltage safety signal 4 to be connected to the safety inputs 3 of brake control unit 1 and frequency converter 2. The electronic safety controller 8 interrupts the safety signal 4 by opening the safety relay 16 contacts such that the +24V DC safety signal voltage does not pass any more from the electronic safety controller 8 to the safety inputs 3.

In the frequency converter 2 the safety signal 4 goes from the safety input 3 to the safe torque off logic 2'. Correspondingly, in the brake control unit 1 the safety signal 4 goes from the safety input 3 to the brake applying logic 1'.

Further, a specific operation-preventing circuit 5 is associated with the safety input 3 of the brake control unit 1 as well as with the safety input 3 of the frequency converter 2. The circuit diagram of operation-preventing circuit 5 is shown in FIG. 2. The operation-preventing circuit 5 is operable to detect an operational anomaly in the safety input 3 and to prevent elevator operation in case an operational anomaly is detected. The operational anomaly may be caused by an overvoltage in the safety input 3. The operational anomaly may be also due to a voltage present in the safety input at a wrong time, e.g. at a time not allowable according to prevailing status of the elevator system. For example, an operational anomaly is detected if voltage is present in the safety input during power-up situation of the elevator system, at a time power is switched on and elevator devices are being initiated. With the operation-preventing circuit 5 it is possible to enhance safety of the brake control unit 1 and the frequency converter 2. The operating principle of the operation-preventing circuit 5 is disclosed hereinafter in connection with two operational anomalies: first case is an overvoltage in the safety input, and second case is a power-up situation of the frequency converter 2/brake control unit 1.

Overvoltage in the Safety Input 3

The operation-preventing circuit 5 comprises a thyristor 6. Anode of the thyristor 6 is connected to cathode of diode 17, and cathode of the thyristor 6 is connected to the signal ground 10 of the safety signal 4. Anode of the diode 17 is further connected to safety input terminal 3, and the purpose of the diode 17 is to prevent outputting an unallowed voltage to the signal path of the safety signal 4.

Two zener diodes 18 having a brake-down voltage of 30 Volts each are connected in series between anode of thyristor 6 and gate 6' of thyristor 6. Additionally, a current-limiting resistor 19 is connected in series with the zener diodes 18.

Resistor 20 and low-pass filtering capacitor 21 are connected in parallel, between thyristor gate 6' and signal ground 10 of the safety signal 4.

When voltage in the safety input 3 raises over 60 Volts, the zener diodes 18 start conducting. At this time current starts to flow to the thyristor gate 6', switching on the thyristor 6. When switched on, the thyristor 6 shorts the safety input 3 through diode 17 to the safety signal ground 10. This has the same effect as interrupting the safety signal 4 with the electronic safety controller 8, e.g. the safe torque off logic 2' disables power supply of the hoisting motor 14 and the brake applying logic 1' applies the electromagnetic brakes 13, thereby elevator operation is prevented.

Due to its operation characteristics, the thyristor 6 continues conducting as long as the unallowed voltage supply is present in the safety input 3. Restoring the elevator operation requires the unallowed voltage supply to be first removed to switch off the thyristor 6.

Further, a clamping diode 23 is connected between safety input 3 and safety signal ground 10. Clamping diode prevents a negative voltage in the safety input 3. A low-pass filtering capacitor 22 is connected in parallel with the clamping diode 23, to even out high-frequency voltage disturbance in the safety input 3.

Power-Up Situation

As power is switched on, operation of elevator control components is first initiated. Initiating includes charging of electrical components such as capacitors, booting of computer control software etc. It is important that during initiation elevator operation is prevented, because operation status of elevator control components is undefined at this time. Normally, it is the safety system that takes care of the operation prevention. Therefore, for example, the electronic safety controller 8 is designed such that the safety relay 16 contacts are kept open during start-up situation to cut off the safety signal 4.

If, however, a foreign +24V DC voltage is connected for some reason past the electronic safety controller 8 and directly to the safety input 3, there is a risk that the brake applying logic 1' and the safe torque off logic 2' would interpret this as a permission to open the electromagnetic brakes 13 and feed current to the hoisting motor 14. Connecting of the foreign voltage might take place, for example, by manually bypassing the safety relay 16 contacts with a bypass wire during maintenance operation. Another reason might be a short circuit in control cables.

To prevent any such unexpected situation, the operation-preventing circuit 5 has a power supply 7, which feeds current through resistor 24 to the thyristor control gate 6' in the power-up situation of the brake control unit 1/frequency converter 2. Only a momentary supply of current is needed to switch on the thyristor 6. When switched on, the thyristor 6 shorts the safety input 3 to the safety signal 4 ground 10 as disclosed earlier. As long as any foreign unallowed voltage supply is present in the safety input 3, the thyristor 6 remains in conducting state and the safety input 3 remains shorted. Therefore, the safe torque off logic 2' and the brake applying logic 1' prevent elevator operation and elevator safety is ensured.

It is obvious to a skilled person that the brake control unit 1, as well as the electronic safety controller 8 may be integrated into the frequency converter 2.

The invention is disclosed hereinbefore in connection with elevator system. However, a skilled person easily understands that the invention may be implemented in automation systems and in other conveyor drive systems, such as escalator drive systems or moving walkway drive systems.

The invention is described above by the aid of a few examples of its embodiment. It is obvious to the person skilled in the art that the invention is not only limited to the embodiments described above, but that many other applications are possible within the scope of the inventive concept defined by the claims.

The invention claimed is:

1. An electronic safety device comprising:
   a safety input terminal configured to receive a safety signal, the electronic safety device configured to block operation of an elevator, if the safety signal is not detected at the safety input terminal; and
   an operation-preventing device configured to detect an operational anomaly in the safety input terminal, the operation-preventing circuit including a switch configured to short the safety input terminal, if the operational anomaly is detected in the safety input terminal.

2. The electronic safety device according to claim 1, wherein the operational anomaly includes a presence of an unallowed voltage applied to the safety input terminal.

3. The electronic safety device according to claim 2, wherein the operation-preventing circuit is configured to detect the unallowed voltage by momentarily shorting the safety input terminal.

4. The electronic safety device according to claim 3, wherein the operation-preventing circuit is configured to detect the unallowed voltage by momentarily shorting the safety input terminal during a power-up situation of the electronic safety device.

5. The electronic safety device according to claim 1, wherein the switch is configured to short the safety input terminal until the operational anomaly is cleared from the safety input terminal.

6. The electronic safety device according to claim 1, wherein the switch is configured to short the safety input terminal, if an overvoltage is detected at the safety input terminal.

7. The electronic safety device according to claim 1, wherein the operation-preventing circuit further comprises:
a power supply having an output terminal coupled to a control pole of the switch.

8. The electronic safety device according to claim 1, wherein the switch is a thyristor.

9. The electronic safety device according to claim 1, wherein the electronic safety device is configured to operate, if the safety signal is present at the safety input terminal.

10. The electronic safety device according to claim 1, wherein the electronic safety device is a control device of an electromagnetic brake.

11. The electronic safety device according to claim 1, wherein the electronic safety device is a conveyor driver.

12. A conveyor system comprising:
a safety system configured to output the safety signal; and
the electronic safety device according to claim 1, the safety input terminal of the electronic safety device configured to receive the safety signal output from the safety system.

13. An electronic safety device configured to control an elevator system, the electronic safety system configured to connect to a controller configured to engage one or more safety devices by selectively disconnecting a safety signal from a safety input terminal associated with the one or more safety devices based on safety data generated by one or more safety contacts, the electronic safety device comprising:
an operation preventing device connected to the safety input terminal, the operation preventing device including a switch, the operation preventing device configured to engage the one or more safety devices by adjusting the switch to short the safety input terminal, if the operation preventing device detects an anomaly present at the safety input terminal.

14. The electronic safety device of claim 13, wherein the controller is configured to disconnect the safety signal from the safety input terminal, if the safety data indicates an abnormal elevator operation.

15. The electronic safety device of claim 14, wherein the abnormal elevator operation is a state in which one or more of the safety contacts are set to an open position.

16. The electronic safety device of claim 15, wherein the one or more safety contacts are set to the open position when an entrance to an elevator hoistway is open and an overspeed governor is activated.

17. The electronic safety device of claim 13, wherein the anomaly at the safety input terminal includes one or more of the safety signal having an abnormal voltage level based on a current state of the elevator system and an overload voltage present at the safety input terminal.

18. The electronic safety device according to claim 13, wherein the switch is configured to short the safety input terminal until the anomaly is cleared from the safety input terminal.

19. The electronic safety device of claim 13, wherein the switch is a thyristor having an anode, a gate, and a cathode, the cathode configured to receive a reference voltage, and the thyristor configured to selectively supply the reference voltage to the anode to short the safety input terminal based on a gate voltage applied to the gate.

* * * * *